Oct. 18, 1955  R. A. YOUNG  2,721,044
CARGO HELICOPTER ASSEMBLY
Filed Dec. 18, 1952  2 Sheets-Sheet 1

INVENTOR
RAYMOND A. YOUNG
BY
ATTORNEYS

Oct. 18, 1955 R. A. YOUNG 2,721,044
CARGO HELICOPTER ASSEMBLY
Filed Dec. 18, 1952 2 Sheets-Sheet 2
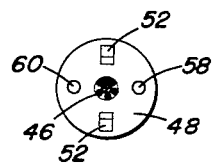
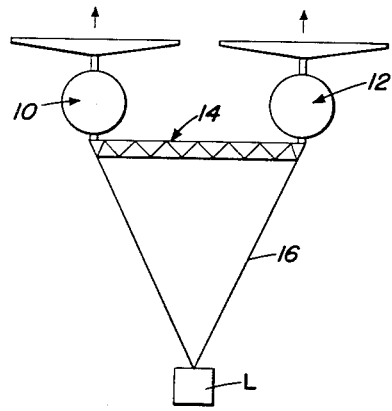
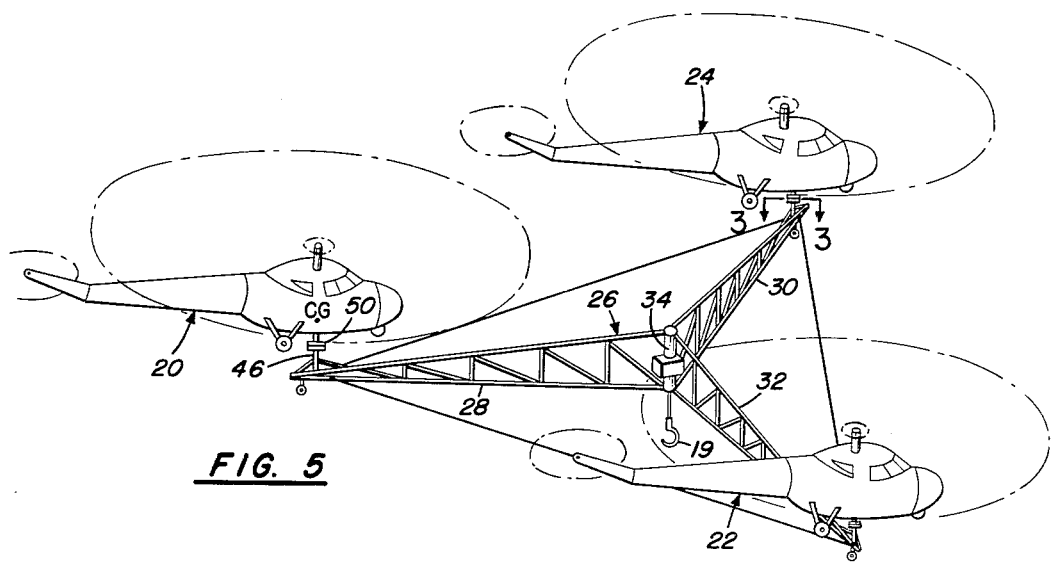
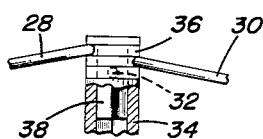
INVENTOR
RAYMOND A. YOUNG
BY
*J. Schmitt*
*Walter S. Paul*
ATTORNEYS

United States Patent Office 2,721,044
Patented Oct. 18, 1955

2,721,044

CARGO HELICOPTER ASSEMBLY

Raymond A. Young, Fairfax, Va., assignor to United States of America as represented by the Secretary of the Navy Application December 18, 1952, Serial No. 326,803

5 Claims. (Cl. 244—2)

(Granted under Title 35, U. S. Code (1952), sec. 266)

The invention described herein may be manufactured and used by or for the Government of the United States of America for governmental purposes without the payment of any royalties thereon or therefor.

This invention relates to the art of aerial transportation using a plurality of aircraft, as helicopters, for cargo objects heavier than the lifting capacity of a single helicopter.

The payload capacity of helicopters presently used is insufficient to pick up and carry for short distances loads that could advantageously be moved by means of a helicopter. Accordingly, it is the general object of this invention to provide means for and a method of teaming two or more conventional helicopters together to realize the required total lifting capacity required to move the loads that are too great for a single helicopter to handle.

Crane type missions that would be performed by the instant invention are highly specialized applications and, would not warrant the development of huge helicopters provided that smaller ones could be used with equal success. An object of the invention is to provide means for transporting loads by a plurality of helicopters, which loads are greater than the capacity of any one of the helicopters used and yet, allow full use of each helicopter for other purposes since very little modification of existing helicopters must be made to adapt them as a component of the invention.

Another object of the invention is to provide means in the instant aerial transportation system that rigidly maintains the helicopers spaced from each other allowing a limited degree of flexibility to compensate for rough air without unduly stressing the rigid part of the structure, whereby the helicopters are prevented from colliding but can maintain the necessary amount of individuality of operation to compensate for peculiarities of each helicopter in flight.

A further object of the invention is to provide means in one of the helicopters for actuating a part of the controls of all of the helicopters, that is the cyclic pitch control system, whereby steering is accomplished by one pilot, but leaving the collective pitch control under the responsibility of each pilot who may compensate for vertical flight characteristics peculiar to his helicopter. Likewise, control of an anti-torque rotor, where used, will remain under the control of each pilot.

Other objects and features, such as the emergency release of the load and means connecting the helicopters, will become apparent in following the description of the illustrated forms of the invention.

In the drawings:

Fig. 3 is an enlarged sectional view taken on the line 3—3 of Fig. 5 and in the direction of the arrows, showing a portion of the quick-disconnect latch devices used;

Fig. 4 is a schematic view of the embodiment of Fig. 1;

Fig. 5 is a perspective view of the embodiment partially shown in Fig. 2, and

Fig. 6 is a fragmentary sectional view of the means releasably connecting sections of the load support structure.

Figure 1:
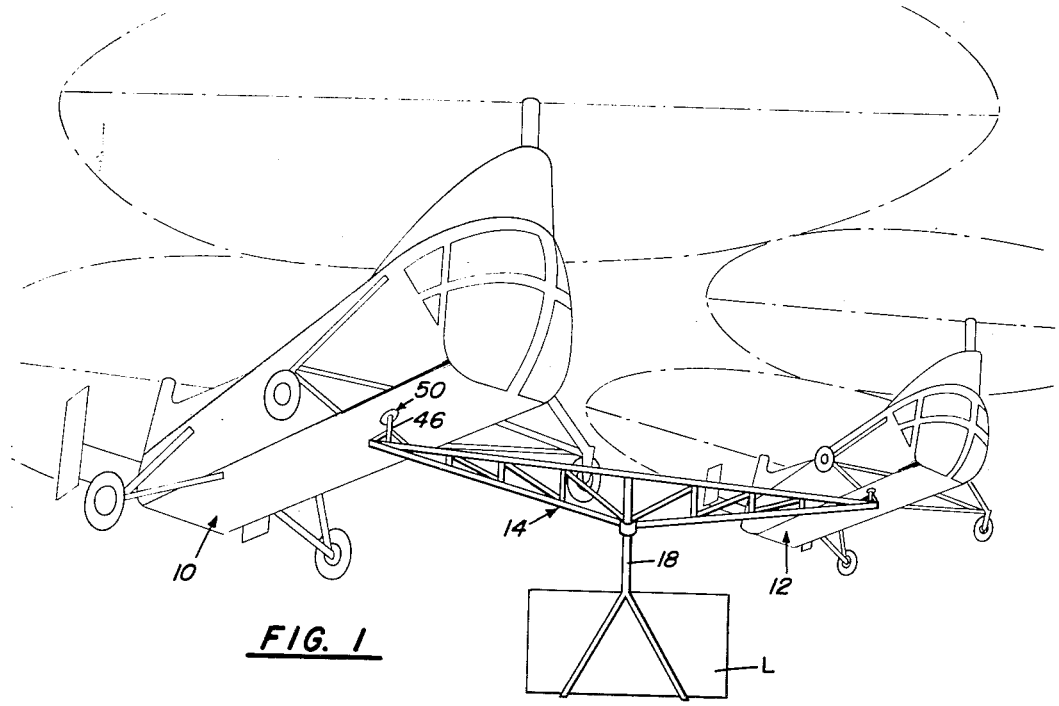
Fig. 1 is a perspective view of one form of the invention.

In Figs. 1 and 4, one embodiment of the invention is illustrated, including two helicopters 10 and 12, each being of a standard configuration and including the various appurtenances contiguous to helicopters of this type. In order to handle load L which is greater than the lifting capacity of either helicopter, the two of them are used simultaneously as shown schematically in Fig. 4. Rigid structure 14, preferably a truss, is disposed between the helicopters, being flexibly connected to each for limited movement with respect to structure 14. Load L is suitably secured to structure 14, for example by cables 16 secured to the ends of structure 14 or cable 18, with or without hook 19 and connected to the center of structure 14.

Fig. 5 illustrates the use of three helicopters 20, 22, and 24 and shows that various known configurations may be used, the invention not being limited to one particular helicopter form. In the tripartite arrangement structure 26 is provided with three frames 28, 30 and 32 connected releasably at a hub 34 so that storage and handling of the structure are facilitated. In this regard, any suitable means of connecting the frames may be used, as the square eyes 36 at the inner ends of the frames receiving square pin 38 that is fitted in a square bore in hub 34. If desired, load supporting structure 14 may be made in sections or, either or both of the load supporting structures 14 and 26 may be hinged for folding more compactly.

Means flexibly connecting the helicopters 10 and 12 to structure 14, and helicopters 20, 22 and 24 to structure 26 are provided. The flexibility is essential to smoothness of operation due to rough air and the fact that the helicopters are individually flown. Thus, if one helicopter lurches suddenly a small amount or yaws slightly, there will not be a direct application of a force to the structure, but rather, the helicopter can move a short distance without applying any load to the structure. There is a practical limit to the amount of allowable freedom of helicopter motion with respect to the load supporting structure, and that is defined by the spacing of the helicopters and their rotor size. They must at all times be maintained sufficiently spaced to prevent collison. Thus, the length of the flexible means will be a function of the helicopter size and load supporting structure size.

The control of the helicopters presents a problem that is solved in the following way. For the simplest arrangement, helicopters, as those at 20, 22 and 24, have hydraulically actuated controls for their cyclic pitch operating system. Such systems are connected to a master accumulator 40 secured to the load support structure. Accordingly, the command pilot assumes complete cyclic pitch control of all of the helicopters, the collective pitch control remaining with individual pilots who will be directed by interphone by the command pilot. This will allow each pilot to compensate for vertical flight characteristics peculiar to his helicopter and to enable him to adjust the power output of his engine for varying conditions. This will save the expense and difficulty of providing instruments in the command helicopter so that it can control each of the helicopter power plants. Likewise, control of the anti-torque rotor, which is dependent upon the power to the main rotor, remains under the control of each pilot. Steering is accomplished by the command pilot through the interconnected cyclic pitch control and by directing the individual by the interphone system to use proper directional and/or collective pitch controls.

Figure 2:
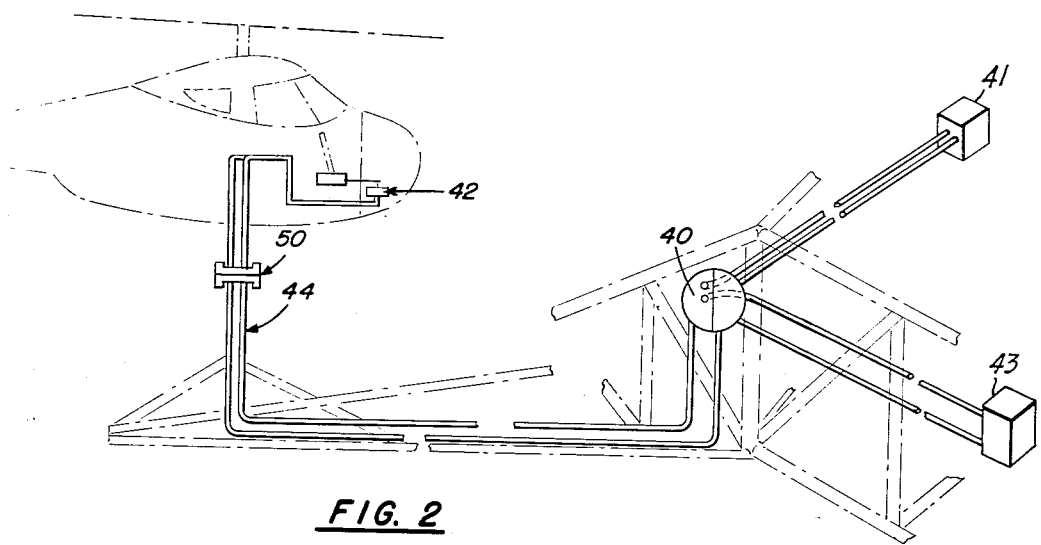
Fig. 2 is a fragmentary schematic view of the mean interconnecting the cyclic pitch controls of all helicopters used in the aerial transportation means.

To assure positive action of the cyclic pitch control systems of each helicopter, a secondary fluid system, generally designated 42 may be installed in the command helicopter (Fig. 2). System 42 includes the accumulator 40 and sufficient conduit 44 interconnecting the secondary system with the regular cyclic pitch controls 41, 43 of the various helicopters.

The aforementioned flexible means connecting the helicopters with the load supporting structures are the same in principle in all applications. The flexible means consist of a cable 46 or the like secured to an end of one of the load supports and provided with one part 48 of a quick disconnect device 50 the structural nature of which is not critically fixed. As an example, it may be a coupling including a male part 48 and a female part held releasably joined by electrically operative latches 52, the operation of which being by a switch, one being provided in each helicopter. Where interphone systems are used, provision for the wires are made in the device 50 by electrical contacts on parts of the device, or, the interphone communication may be accomplished by radio, requiring no wiring between helicopters. To establish fluid flow for cyclic pitch control, conduits 44 are coupled in device 50, suitable check valves two of which are shown at 58 and 60, being used in the device to prevent fluid leakage when connecting and disconnecting the load supporting structure to the helicopters.

In practical use each helicopter should be locally strengthened at its center of gravity, at which place the flexible connecting means are secured. The load is secured to the load supporting structure, and then the quick-disconnect devices 50 fastened. After checking each helicopter, the pilots take off, lifting the structure and its load. Where provision is made for cyclic pitch control of each aircraft in the command craft, the command pilot will take over directional control of each helicopter with the remainder of the flying operations performed by the pilot in his individual aircraft.

What is claimed is:

1. In a load lifting and transporting assembly, a plurality of helicopters each having hydraulically actuated controls for its cyclic pitch control system, a rigid structure to which a load is adapted to be secured, means releasably connecting said structure to the helicopters, an accumulator secured to said rigid structure, and means connecting said controls to said accumulator so that complete cyclic pitch control of each of said helicopters may be undertaken by the hydraulically actuated controls of one of said helicopters.

2. The combination of claim 1 and; said connecting means being flexible, being shorter than the rotor radius of the helicopter to which it is connected, and being secured to its helicopter at approximately the center of gravity thereof.

3. The combination of claim 2 and; said connecting means including a cable with a latching device interposed therein.

4. In combination with a plurality of helicopters, a rigid load supporting structure, flexible means connecting each helicopter with said supporting structure for limited movement with respect to said load supporting structure, and including latch devices rendering said structure releasable with respect to said helicopters, and means operable from one helicopter for at least partially controlling the flight of each helicopter.

5. In the art of aerial transportation, a plurality of helicopters, load distributing means interconnecting said helicopters, said means including a rigid structure provided with load attaching means intermediate its ends, and flexible means adjacent to the ends of said structure for releasably connecting said structure to the helicopters, said flexible means being sufficiently short to always maintain said helicopters spaced from each other thereby preventing said helicopters from colliding, said flexible means including quick disconnect means operable from each of said helicopters.

References Cited in the file of this patent
UNITED STATES PATENTS

| | | |
|---|---|---|
| 1,340,053 | Janda | May 11, 1920 |
| 1,546,443 | Glessner | July 21, 1925 |
| 1,705,904 | Davis | Mar. 19, 1929 |
| 2,413,074 | Savage | Dec. 24, 1946 |
| 2,529,629 | Pullin | Nov. 14, 1950 |
| 2,540,543 | Neville | Feb. 6, 1951 |
| 2,589,826 | Larsen | Mar. 18, 1952 |
| 2,613,961 | Wescott | Oct. 14, 1952 |